UNITED STATES PATENT OFFICE.

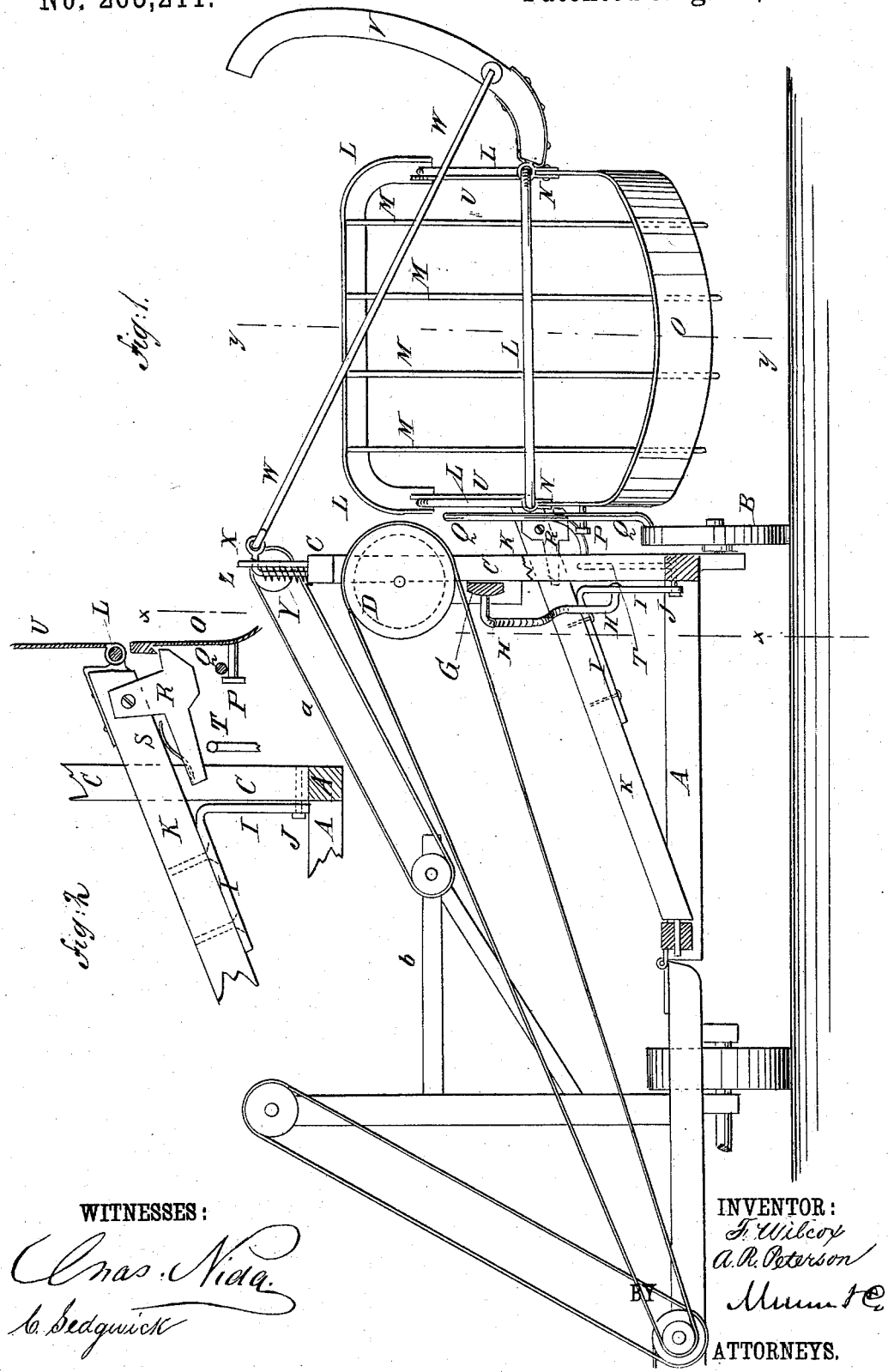

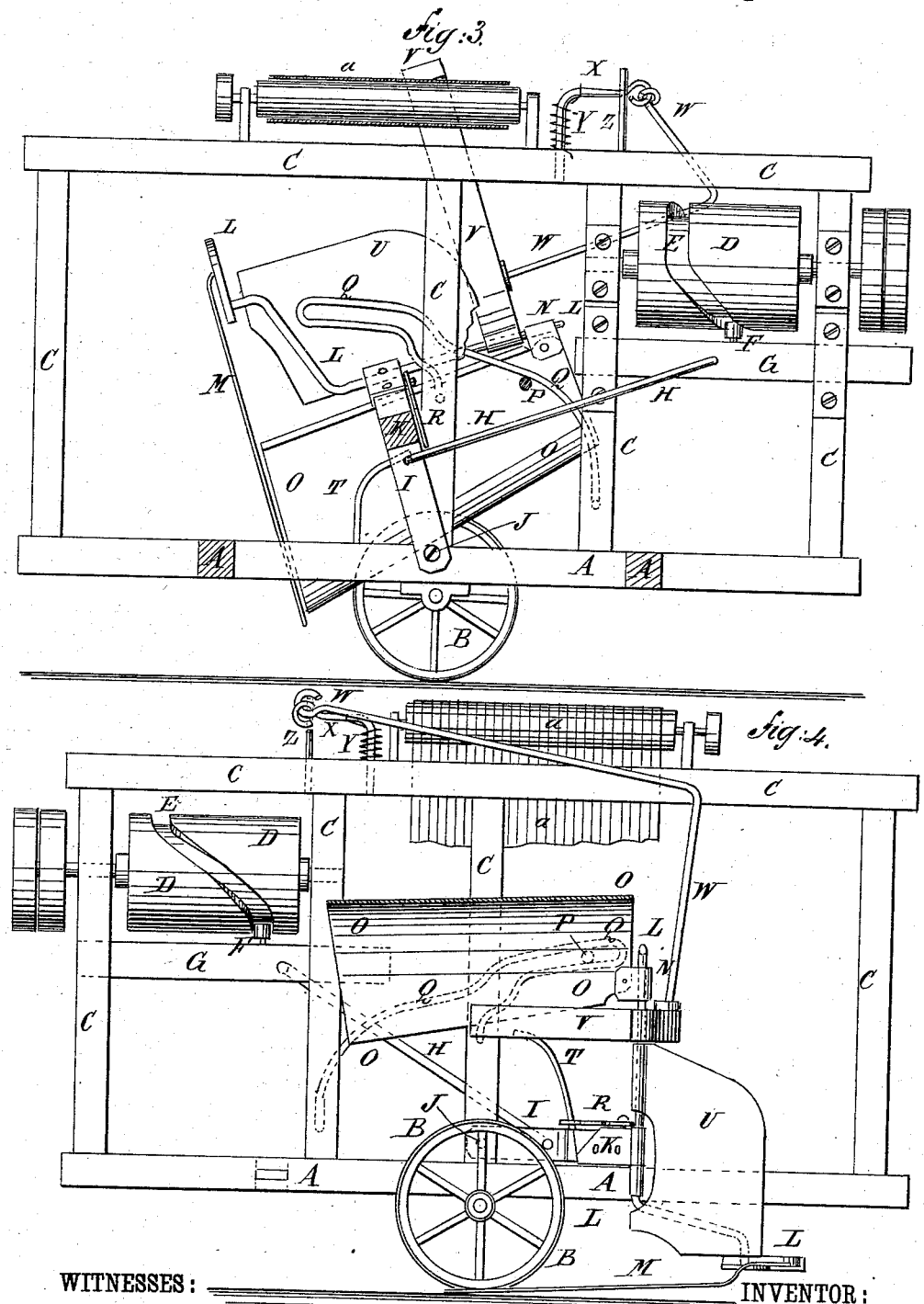

ANDREW R. PETERSON AND FRANK WILCOX, OF HANCOCK, MINNESOTA; SAID PETERSON ASSIGNOR TO CHARLES W. COMSTOCK AND MYRON M. PLATT, OF SAME PLACE.

GRAIN-SHOCKER.

SPECIFICATION forming part of Letters Patent No. 263,211, dated August 22, 1882.

Application filed April 18, 1882. (Model.)

*To all whom it may concern:*

Be it known that we, ANDREW R. PETERSON and FRANK WILCOX, of Hancock, in the county of Stevens and State of Minnesota, have invented certain new and useful Improvements in Grain-Shockers, of which the following is a full, clear, and exact description.

Reference is to be had to the accompanying drawings, forming part of this specification, in which similar letters of reference indicate corresponding parts in all the figures.

Figure 1, Sheet 1, is a sectional rear elevation of our improvement. Fig. 2, Sheet 1, is a sectional rear elevation of a part of the same enlarged. Fig. 3, Sheet 2, is a sectional side elevation of the same, taken through the line $x\ x$, Fig. 1, and looking to the right. Fig. 4, Sheet 2, is a sectional side elevation of the same, taken through the line $y\ y$, Fig. 1, and looking to the left.

The object of this invention is to facilitate the shocking of bound grain as it is delivered from a harvester.

The invention consists in a grain-shocker constructed with a receiver-frame attached to a pivoted inclined bar kept in place by a pivoted crank-arm and operated from a cam-wheel by a slide and connecting rod. The receiver-frame is provided with a hinged curved plate operated by a pin and a bent guide-rod, and held in place, when closed, by a spring-pressed latch, which is tripped at the proper time by a bent rod. The receiver-frame is also provided with a curved hinged arm for holding the bundles in place in the receiver, and is connected with the frame by a connecting-rod and pivoted spring-pressed crank, so that the said hinged arm will be operated by the movements of the receiver-frame, as will be hereinafter fully described.

A is the base-frame of the machine, which is hinged or otherwise loosely connected at its inner side to the frame of a harvester, at or near the binding-platform, so that the machine can adjust itself to the surface of the ground. The outer part of the frame A is supported upon one or more wheels, B, and to the outer side of the said frame A is attached an upright frame, C.

To the upper rear part of the frame C is journaled the cylinder D, which is designed to be driven from the driving mechanism of the harvester by a belt and pulleys, a chain and chain-wheels, or other suitable gearing, the said gearing being so arranged that it can be thrown into and out of gear at the pleasure of the operator. In the face of the cylinder D is formed a cam-groove, E, to receive a pin, F, attached to a bar, G, placed beneath and parallel with the cylinder D, and which slides in keepers or bearings formed in or attached to the rear posts of the frame C.

To the sliding bar G is pivoted the upper end of a connecting-rod, H, the lower end of which is pivoted to a crank-arm, I. The lower end of the crank-arm I works upon a pivoting-bolt, J, attached to the lower part of the middle post of the frame C. The upper end of the crank-arm I is attached to the bar K at a little distance from its outer end. The bar K is placed in an inclined position, and its inner end is pivoted to the inner bar of the frame A at a point in line with the pivoting-bolt J, as shown in Fig. 1. With this construction the outer end of the bar K will be moved back and forth through an arc of a quarter of a circle at each revolution of the cam-cylinder D.

The outer end of the pivoted bar K is rigidly attached to the inner side bar of the frame L, so as to carry the said frame with it in its movements.

The frame L is formed of a top bar, a bottom bar, and two side bars. The side bars of the frame L are made with forward offsets at points a little below the level of the outer end of the bar K, so that the bottom bar of the said frame will be in advance of the top bar, as shown in Figs. 1, 3, and 4.

To the bottom bar of the frame L are attached a series of rearwardly-projecting fingers, M, as shown in Figs. 1, 3, and 4.

To lugs N or other supports attached to the upper parts of the side bars of the frame L are hinged the upper corners of the curved plate O, so that the said plate O can be adjusted to bring its side edges against or near the side bars of the said frame, as shown in Fig. 3, and can be swung away from the said frame, as shown in Fig. 4.

To the inner side of the curved back plate,

O, at a little distance in the rear of and below the hinging-pivot, is attached a stud or pin, P, which moves along a guide rod or track, Q, so formed as to cause the said back plate, O, to move toward and from the frame L at the proper times.

To the outer end of the bar K is pivoted a lever-latch, R, which engages with a lip or other catch formed upon or attached to the side edge of the curved back plate, O, to hold the said plate in place when swung against the side bars of the frame L. The free arm of the lever-latch R is held back by a spring, S, holding the forward end of the said latch in position to engage automatically with the back plate, O, when the said plate is swung against the side bars of the frame L.

To the outer bar of the base-frame A is attached the lower end of a rod, T, the upper part of which is curved to the rearward in such a direction that the free end of the latch R will strike against it at the proper time to release the back plate, O, and allow it to be swung away from the frame L.

To the side bars of the frame L are attached the rear edges of forwardly-projecting plates or wings U, to serve as guides to direct the bundles of grain into the receiver and as guards to keep the said bundles in place when in the receiver.

To the outer side bar of the frame L, just below the lug N, is hinged the end of a curved arm, V, of such a length that its free end will reach nearly to the inner side bar of the said frame L.

To the curved arm V, at a little distance from its hinged end, is pivoted the lower end of a rod, W, which projects upward and is then bent inward and rearward nearly at right angles, and its upper end is jointed to the upper arm of a crank, X. The end of the lower arm of the crank X is pivoted to the top bar of the frame C. The upper arm of the crank X is held to the rearward by a spring, Y, connected with the said crank and with the frame C. The rearward and inward movement of the upper arm of the crank X is limited by a pin, Z, attached to the top bar of the frame C, as shown in Figs. 1, 3, and 4.

In using the machine the bound bundles are carried by an elevator, a, from the binding-table b to the top of the frame C, and are allowed to drop into the curved back plate, O, which serves as a receiver, the butts of the bundles resting against the fingers M. When enough bundles for a shock have been dropped into the receiver the cam-cylinder D is thrown into gear with the driving mechanism of the harvester, which moves the bar K and turns the frame L, bringing the fingers M parallel with and close to the ground, so that the bundles of grain will be in a vertical position with their butts upon the ground. At the same time the movement of the frame L swings the curved arm V inward against the forward side of the collection of bundles to keep the said bundles from tipping forward, the bent rod T moves back the latch R, and the guide-rod Q, acting upon the pin P, swings the back plate, O, rearward and upward, so that the advance of the machine will leave the bundles of grain standing upon the ground. As the cylinder D completes its revolution and is thrown out of gear the various parts of the machine are returned to their former position, ready to again receive bundles of grain.

Having thus fully described our invention, we claim as new and desire to secure by Letters Patent—

1. A grain-shocker constructed substantially as herein shown and described, and consisting of the cam-cylinder D and its slide G and connecting-rod H, the pivoted inclined bar K, having spring-pressed latch R, the frame L, having fingers M, the hinged back plate, O, having pin and guide-rod, and the curved arm V and its connecting-rod, crank-arm, and spring, as set forth.

2. In a grain-shocker, the receiver constructed substantially as herein shown and described, and consisting of the frame L, having fingers M attached to its bottom bar, the hinged back plate, O, and the hinged arm V, whereby the bundles are received and placed erect upon the ground, as set forth.

3. In a grain-shocker, the combination, with the frame L, of the cam-cylinder D, the slide-bar G, the connecting-rod H, the crank-arm I, and the pivoted inclined bar K, substantially as herein shown and described, whereby the said frame is operated by the revolution of the said cylinder, as set forth.

4. In a grain-shocker, the combination, with the pivoted inclined bar K and the hinged receiver-plate O, of the spring-held latch R and the curved trip-rod T, substantially as herein shown and described, whereby the hinged plate will be released automatically by the movement of the said pivoted bar, as set forth.

5. In a grain-shocker, the combination, with the frame L, the hinged receiver-plate O, and means for operating said frame, of the pin P, secured to the back plate, and the curved guide-rod Q, substantially as herein shown and described, whereby the said plate is opened and closed automatically as its supporting-frame is operated, as set forth.

6. In a grain-shocker, the combination, with the frame L, carrying the hinged back plate, O, of the hinged curved arm V, the connecting-rod W, the pivoted crank X, and the spring Y, substantially as herein shown and described, whereby the said curved arm is operated automatically to hold the bundles in place in the receiver by the movement of the receiver-frame, as set forth.

ANDREW R. PETERSON.
FRANK WILCOX.

Witnesses:
R. E. MARO,
BYRON WILCOX.